United States Patent [19]

Hebert

[11] Patent Number: 4,872,413
[45] Date of Patent: Oct. 10, 1989

[54] CRAYFISH HARVESTER BOAT APPARATUS

[76] Inventor: Roland J. Hebert, Rte. 3, Box 1492, Abbeville, La. 70510

[21] Appl. No.: 196,723

[22] Filed: May 19, 1988

Related U.S. Application Data

[63] Continuation of Ser. No. 850,704, Apr. 11, 1986, abandoned.

[51] Int. Cl.$^4$ ............................................. B63B 35/14
[52] U.S. Cl. .................................. 114/270; 114/255; 114/83; 440/92
[58] Field of Search ........ 114/270, 255, 344, 352–355, 114/58, 83, 85, 343; 440/33, 36, 90–92, 98–100; 37/55

[56] References Cited

U.S. PATENT DOCUMENTS

| | | | |
|---|---|---|---|
| 12,375 | 2/1855 | Berdan | 114/354 |
| 1,401,889 | 12/1921 | Donelley | 114/270 |
| 3,306,250 | 2/1967 | Pitchford | 114/270 |
| 3,605,296 | 9/1971 | Dysart | 440/100 X |
| 3,820,497 | 6/1974 | Konijn | 114/270 |
| 4,591,015 | 5/1986 | Korproo et al. | 440/92 X |

*Primary Examiner*—Sherman D. Basinger
*Assistant Examiner*—Paul E. Salmon
*Attorney, Agent, or Firm*—Pravel, Gambrell, Hewitt, Kimball & Krieger

[57] ABSTRACT

A crayfish harvester boat apparatus having a principal boat portion open ended with side walls and a bottom portion defining a container and occupant space therewithin; a pair of rear drive wheels hingedly mounted to the rear portion of the boat, and a steering wheel hingedly mounted to the front portion of the boat, the rear drive wheels in front steering wheel so mounted to the boat so that upon application of pressure, the boat can be lifted from position flat against the ground to a position substantially above the location of the rear drive wheels and front steering wheels; the power means including hydraulically controlled pistons for lowering and raising the boat between positions. There is further included a power drive system connected onto the rear drive wheels for providing a plurality of drive speeds to the apparatus as it is propelled on land or in water.

4 Claims, 5 Drawing Sheets

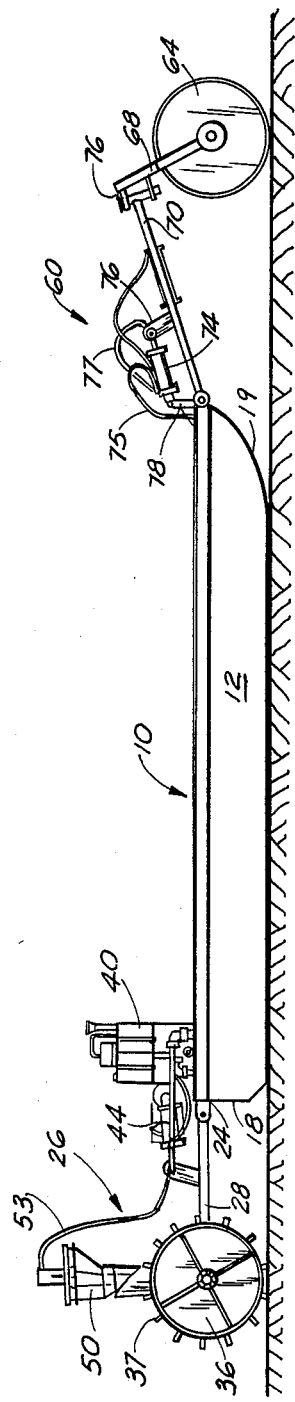
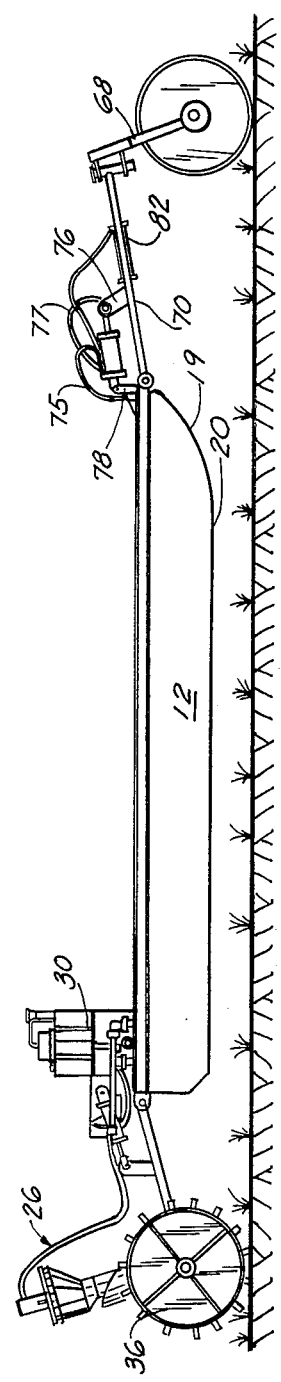
FIG. 1
FIG. 2

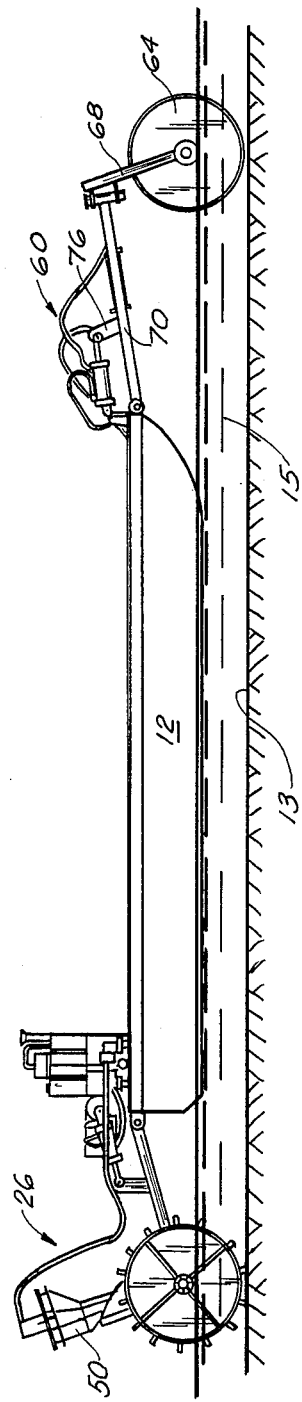
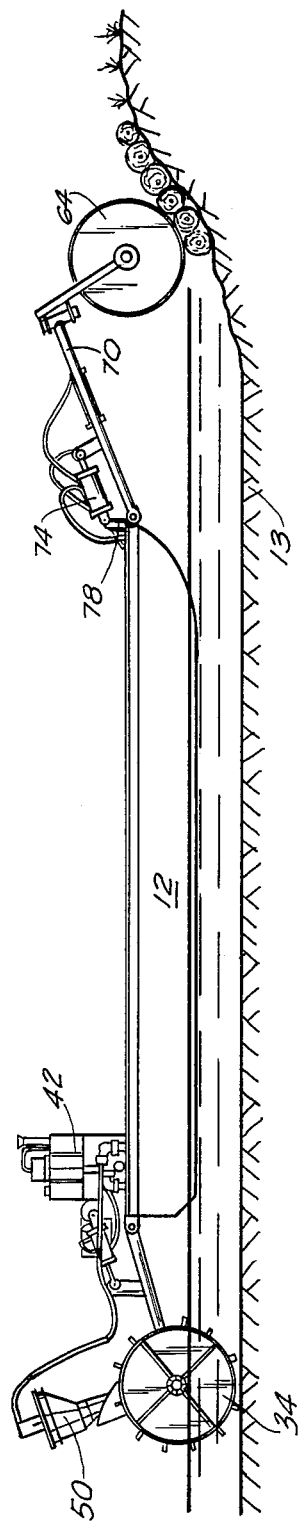

CRAYFISH HARVESTER BOAT APPARATUS

This is a continuation of application Ser. No. 850,704 filed on Apr. 11, 1986, entitled "Crayfish Harvester Apparatus" by the same inventor and now abandoned.

BACKGROUND OF THE INVENTION

1. Field of the Invention

The present apparatus relates to harvesting crayfish. More particularly, the present invention relates to an apparatus which has the unique ability to harvest crayfish within the confines of a pond and yet be self-propelled over the levees and banks from one pond to the next without the use of outside vehicular assistance.

2. General Background

A principal industry within the state of Louisiana is the raising and harvesting and selling of crayfish which are grown in vast quantities in the lower lying areas in "ponds" which are often acreage of land utilized in rice forming, which are flooded and are thriving with crayfish within the confines of the land area. In order to maintain the pond, i.e., the water confined within the area, dirt levees are constructed around the land area so that the crayfish may grow to full size and be harvested.

For the process engaged in harvesting the crayfish, what is normally entailed is a series of wire traps placed beneath the water surface of the pond in parallel rows throughout the acreage. The traps, once baited, allow the crayfish to crawl into the trap to get to the bait, but are so constructed that the crayfish can not exit the trap and are therefore caught within the confines to be harvested by the harvester. In order to facilitate the harvesting of the crayfish, numerous methods have been utilized, the most successful being a boat or the like .which is simply maneuvered between the traps while one occupant of the boat pulls the trap up, the other occupant guides the boat through the traps as their contents are harvested. What has evolved from that practice is a particularly constructed boat which includes often times front and rear mounted drive wheels which make contact with the bottom of the shallow pond and propel the boat along its course through the pond while the harvesting is taking place. This particular apparatus has been found to be most useful since it is able to be guided or run along the relatively straight path and can not "float" off course since the wheels are actually making contact with the bottom of the pond.

However, at the present time farmers who are using the aluminum flat boats do not have the ability to transport the boat from one pond to another since, in order to do so, one must cross the levees and often times the boat must be moved to a pond which is a distance away and therefore be transported over roads, bridges or fields. At the present time, harvesters drag their boats with tractors or transport them by trailers. This practice is very time consuming, often results in damage to the boat and requires additional manpower in order to somehow move the boat over the levees and onto the vehicle for transport.

In addition to the boats that were before described in the harvest of crayfish, several patents were obtained which relate to a boat type vehicle having wheels in one fashion or another. These patents are as follows:

U.S Pat. No. 2,960,056 issued to Puccinelli, entitled "Roadable Boats", relates to a boat which can be operated on both land and water without any change either in the propelling or the operating of the machine. In addition, it has the ability to likewise be towed as a trailer or driven into the water and operated as a motor boat.

U.S. Pat. No. 3,306,249 issued to Chase, entitled "Propeller, Rudder and Wheel Assembly For Boats" provides a combination propeller, rudder and wheel assembly for boats employing a propeller and intergrated wheel at each side of the boat, adapted for rotation between two positions wherein the wheels are lowered as the propeller and rudder are raised and vice-versa, facilitating operation of the boat on water or on land without a trailer.

U.S. Pat. No. 2,449,320 issued to Raimondi, entitled "Land And Water Vehicle", relates to improvement in the vehicle adapted to be used for land and water transportation wherein four (4) wheels are utilized for running on land, each of the wheels having two opposed paddles providing locomotion in water.

U.S. Pat. No. 4,008,679 issued to Bozzano, entitled "Motor Boat Provided With Power Operated Retractable Wheels For Landing on Beaches", relates to a motor boat provided so that the hull of the boat is provided on its bottom with three (3) recesses disposed in a tricycle arrangement. Each housing a retractable land wheel shudders being provided operatively associated with a retractable wheels to close the wheel housing recess each time the wheels are retracted in the recesses in order to reestablish the continuity of the hull bottom.

U.S. Pat. No. 3,595,199 issued to Faxas, entitled "Jet Propulsion System For Amphibious Vehicle", presents a controlled water jet as the prime motive force when water born provides elimination of on-board pumps, uses one or more drive wheels or perferrably pairs of opposing drive wheels as axial flow impellers whereby water can be forced laterally inwardly or outwardly as the case may be through the drive wheel in a flow direction which is parallel to the axis.

U.S. Pat. No. 2,606,519 issued to Branco, entitled "Land And Water Vehicle", which is designed to resemble a boat having four (4) drive wheels provided with paddles to provide propulsion means for the vehicle when traveling on the water and also to provide drive means for the vehicle when traveling on land.

U.S. Pat. No. 3,797,446 issued to Cox, et al, entitled "Mobile Power Unit" provides a device which includes a source of power means engaged but with a travel surface to propel the source of the power enlongated handle assemblies extended forwardly. The source of power between which the operator is situated and means convenient to the operator to control the source of power in a breaking assembly incorporated with the unit.

SUMMARY OF THE PRESENT INVENTION

The apparatus of the present invention solves the shortcomings in the present state of the art in a straight forward manner. What is provided is a crayfish harvester boat apparatus having a principal boat portion open ended with side walls and a bottom portion defining a container and occupant space therewithin; a pair of rear drive wheels hingedly mounted to the rear portion of the boat, and a steering wheel hingedly mounted to the front portion of the boat, the rear drive wheels in front steering wheel so mounted to the boat so that upon application of pressure, the boat can be lifted from position flat against the ground to a position substantially above the location of the rear drive wheels and front steering wheels; the power means including hydraulically controlled pistons for lowering and raising the boat between positions. There is further included a power drive system connected onto the rear drive wheels for providing a plurality of drive speeds to the apparatus as it is propelled on land or in water. Further, the drive wheels further comprise a series of transverse metal treads mounted on their drive surface for propelling the boat over obstacles without resulting in bogging down of the appparatus. Further, there may be provided a reinforcement member extending the length of the boat for reinforcing the structural integrity of the boat as it is propelled over obstacles from land to water or water to land as the case may provide.

Therefore, it is an object of the present invention to provide a crayfish harvester boat apparatus which allows the boat portion of the apparatus to be lifted and lowered between certain positions;

It is a further object of the present invention to provide a crayfish harvester boat apparatus which is hydraulically powered in both sterring and propelling of the apparatus;

It is still a further object of the present invention to provide a crayfish harvester boat apparatus which may be propelled from water onto land, over levees and the like without the need for exterior systems in the use of the apparatus.

BRIEF DESCRIPTION OF THE DRAWINGS

FIG. 1 is a side view of the perferred embodiment of the apparatus of the present invention of the boat portion in the up position;

FIG. 2 is a side view of the perferred embodiment of the apparatus of the present invention of the boat portion in the down position;

FIG. 3 is a side view of the perferred embodiment of the apparatus of the present invention with the apparatus within the water;

FIG. 4 is a side view of the perferred embodiment of the apparatus of the present invention with the apparatus being propelled out on the land;

DETAILED DESCRIPTION OF THE PERFERRED EMBODIMENT

Figure 5:
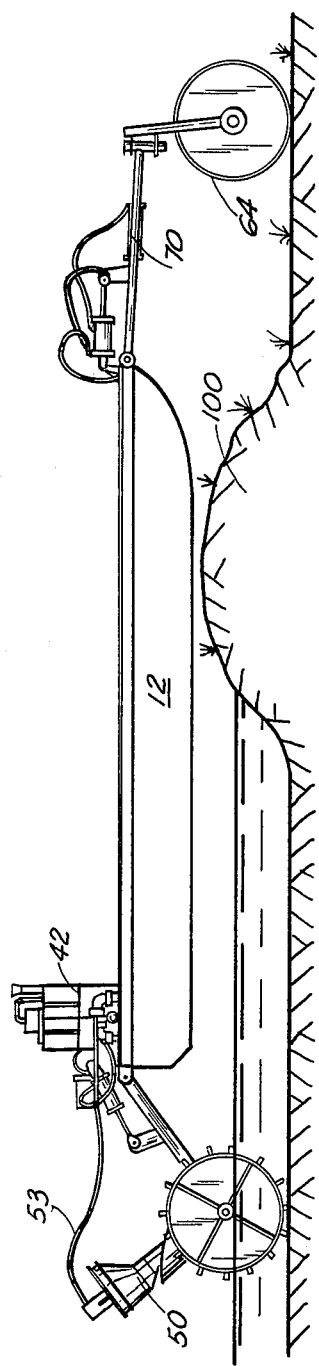
FIG. 5 is a side view of the perferred embodiment of the apparatus of the present invention illustrating the apparatus crossing a levee.
Figure 6:
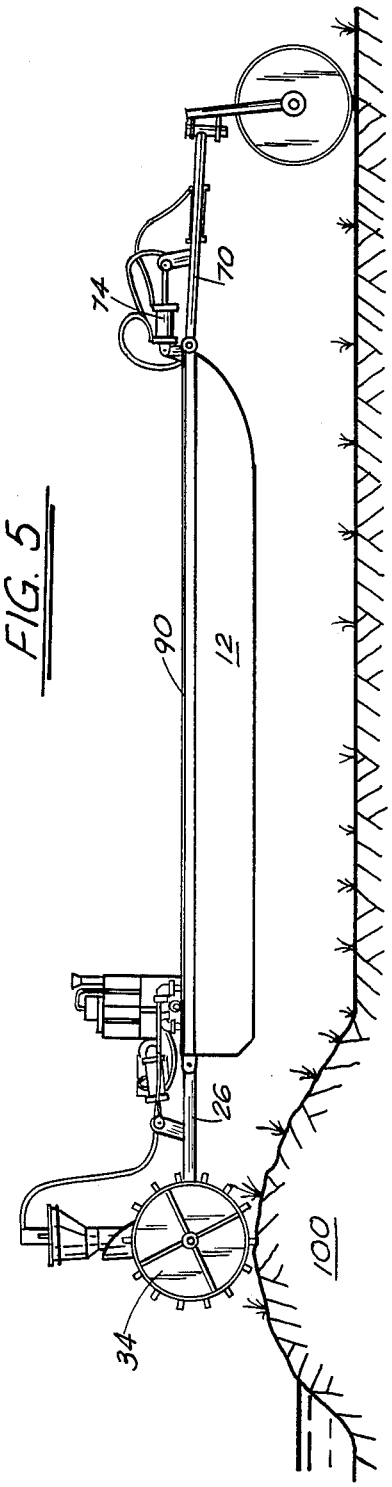
FIG. 6 is a side view of the perferred embodiment of the apparatus of the present invention illustrating the apparatus traveling upon land.

FIGS. 1-9 illustrate the perferred embodiment of the apparatus of the present invention illustrated by the numeral 10. Crayfish harvester boat 10 generally comprises a main flat boat portion 12 which is a typical flat boat having left and right side walls 14 and 16 respectively, rear wall 18 and front rake portion 19, which is curved upward to allow the boat to move easily in the water. In the perferred embodiment, the wall portions and rake portion constitute a foot to a foot and a half in height, and together with the continuous bottom portion 20 define a cargo and occupant space 22 therewithin and bouyant in the water. Of course, the typical flat boat may contain seating or the like within the confines of space 22. Mounted on the rear wall 18 of flat boat 22, there is seen in the FIGURES, particularly in FIG. 9, a mounting bracket 24 which is secured to the rear wall 18 via welding or the like, and for mounting the drive means 26 as illustrated in the FIGURES.

Figure 7:
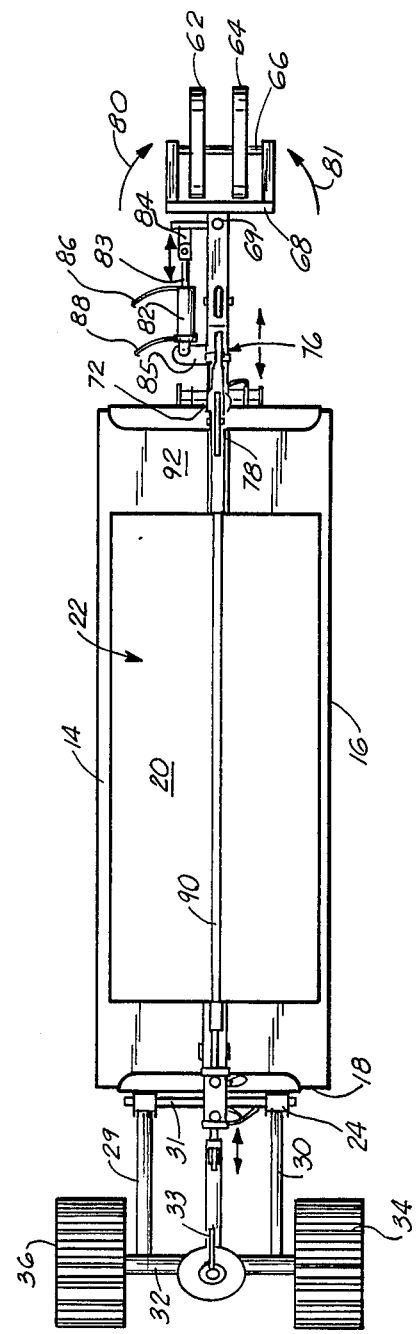
FIG. 7 is the top view of the perferred embodiment of the apparatus of the present invention.
Figure 8:
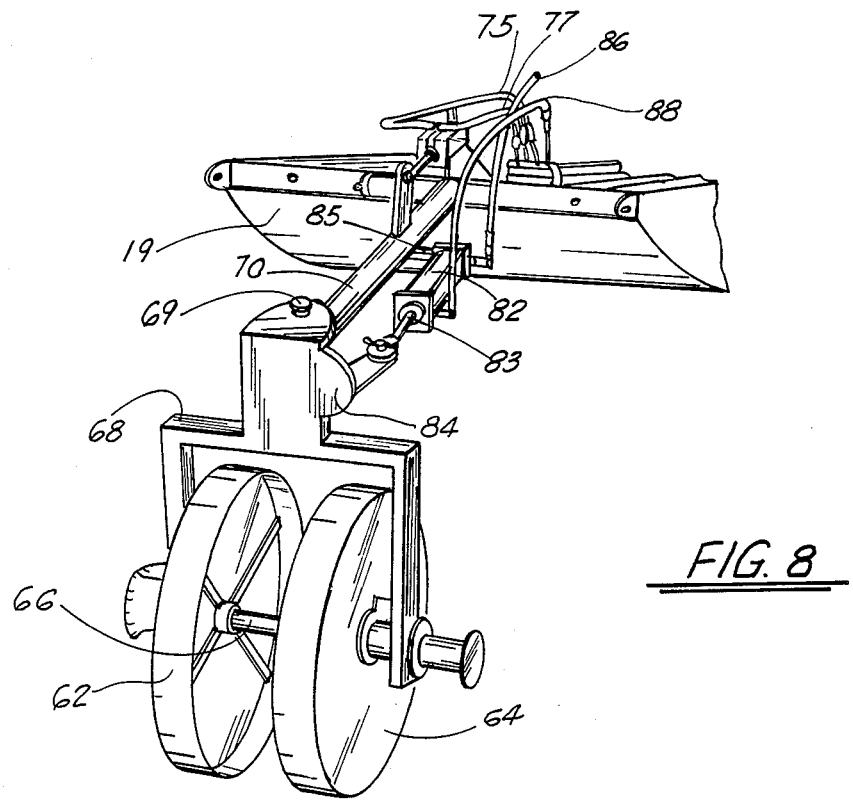
FIG. 8 is an overall front partial view of the steering system of the apparatus of the present invention.
Figure 9:
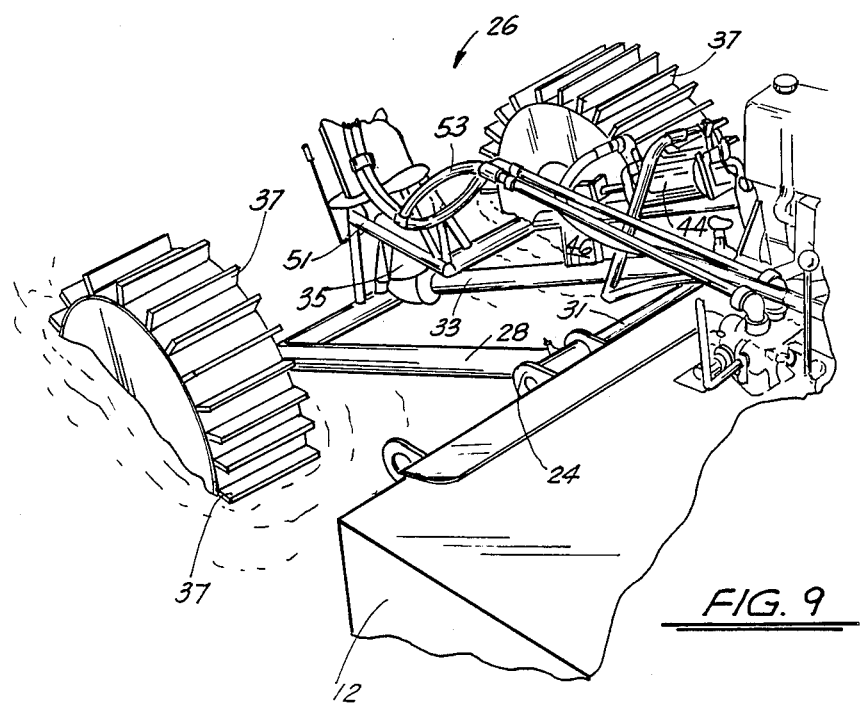
FIG. 9 is an overall view of the propelling system of the apparatus of the present invention.

Drive means 26 comprises a frame portion 28 which would include a pair of frame members 29 and 30 which constitute elongated pipe hingedly attached on their first end to mounts 24 as seen in top view of FIG. 7 and on their second end to axle 32 housing drive wheels 34 and 36, respectively. Further, there is included a transverse mounting bar 31 running intermediate bars 29 and 30 to form a substantially rectangular mount between drive wheels 34 and 36 and the boat 12. As seen in side view and top view, the drive means 26 is hingedly engaged to the mounting brackets 24 so that the entire mounting system including the mounting frames 29, 30 and axle 32 is moved upward and downward as provided for in the use of the apparatus.

Movable mounting between the power wheels 26 and boat 12 is provided by a hydraulic system 40 which comprises a standard hydraulic engine 42 for providing hydraulic fluid to a variety of pistons that will be utilized in the apparatus. One such piston is piston 44, which is seen in side view in FIG. 1, wherein one end of the piston is connected to an upright mounting bracket 46 contained on central mounting bar 33 and the second end of the piston is connected onto a second upright bracket 48 firmly attached to the boat frame so that pressurization and depressurization of hydraulic cylinder 44 with hydraulic fluid results in upward and downward movement between the drive system 26 via frame 28 and relative to boat 12.

In the actual driving mechanism of the boat, the drive system 26 is provided with a transmission 50 which is directly mounted onto the rear axle 32 via mounting frame 51 to the point of differential 35 for imparting direct power to drive wheels 34 and 36 respectively. For purposes of brevity, it should be noted that transmission 50 is a multi-drive standard transmission, and is driven by hydraulic motor 52 mounted thereupon likewise receiving power via hydraulic lines 53 from hydraulic system 42. The multi-speed transmission 50 allows the mechanism to be utilized in a variety of speeds whether it is within water or over roads or bridges or crossing levees.

Turning now to the steering system of boat 12, it should be noted that the steering system 60 comprises a pair of main steering wheels 62 and 64 which are freely mounted to axle 66, axle 66 mounted within frame 68. Frame 68 is hingedly mounted at point 69 to extended column 70 which extends on its first end from the front portion of boat 12 wherein it is hingedly attached thereto via hinge 72 so that column 70 is able to impart upward and downward movement between boat 12 and steering system 60. So as to facilitate the upward and downward movement between steering system 60 and boat 12 there is provided again hydraulic cylinder 74, which is attached between mounting bracket 76 contained on frame 68 and mounting bracket 78 contained on the front portion of boat 12. Therefore, as with drive mechanism 26, depressurization of cylinder 74 with hydraulic fluid supplied by lines 75 and 77, likewise imparts upward and downward movement between steering system 60 and boat 12.

In order to accommodate movement of steering wheels 62 and 64 in the direction of Arrows 80 and 81 as seen in FIG. 7, there is further provided an additional hydraulic steering means comprising hydraulic cylinder 82 wherein piston 83 is mounted on its first end to mounting bracket 84 rigidly mounted to steering frame 68 and on its second end to mounting bracket 85 mounted on column 70. Again, pressurization and depressurization of hydraulic cylinder 82 from hydraulic fluid supplied via lines 86 and 88 would likewise impart movement to frame 68 and drive wheel 62 and 64 between left and right turning positions as indicated by Arrows 80 and 81 in FIG. 7 through substantially a 180 degree angle.

Returning to the actual structure of both the driving wheels and the steering wheels, it should be noted in the FIGURES that drive wheels 34 and 36, due to the fact that they must impart a driving push to the apparatus as it is prepelled either within the mud bottom in the pond or over the steep inclines of the levels or over bridges or the like, structually wheels comprise approximately each a 14 inch width drive face having a plurality of transverse (perferrably 3 inch in depth), plates 37 rising perpendicular form the surface of the face, to serve as a means for cutting into the surface upon which they are moving in order to provide the necessary amount of traction. On the other hand, steering wheels 62 and 64 may be 2 to 3 inches in width, and have a flat smooth surface since their only purpose is to steer the apparatus, and since they are free rotating wheels, do not require traction means such as the drive wheels. In fact the less traction on the front wheels the more beneficial since they would tend to climb levees or the like much easier without such traction members mounted thereupon.

An additional structural feature of the boat portion of the apparatus, is the presence of removable bar 90 which is mounted between the rear top portion 91 of the boat and front top portion 92 of the boat. Bar 90 comprises a substantially rectangular 1 inch square rectangular bar which when placed in position as seen in FIG. 7 establishes a more rigid structure to the overall boat as the boat is being moved over levees or the like. It has been found in the utilization of the boat that movement of the boat in this manner engages significant stress on the frame of the boat, and rather than that stress being imparted into the actual skin of the boat which may create rupture, the bar helps to take some of the stress off of the boat itself and enable it to be transported over the levees safely while not needed, bar 90 is easily removable.

The overall views particularly in views 1-6, illustrate apparatus 10 as it is being utilized in various conditions. For example, in FIG. 1 and 2, it is readily seen that the reasons behind the fact that the drive system 26 and steering system 60 are mounted onto boat 12 via hinges which allows upward and downward movement relative to one another. As an example in FIG. 2, boat 12 is flush onto surface 13 which may be the ground or the road. Upon activation of the hydraulic cylinder 44, on the drive system 26 and hydraulic cylinder 74 on the steering system 60, what occurs is that upon hydraulic cylinders expanding the piston outwardly, since the wheels are fixed to the ground, the boat must therefore be lifted to a position as seen in FIG. 1 above the level of the ground to accomodate the expansion of the hydraulic cylinders as seen in FIG. 1, as seen of particular importance in FIGS. 3-6.

As seen in FIGS. 3, boat 12 is moving along the surface of the pond with the drive wheels 34 and 36 propelling it along and steering wheels 62 and 64 steering it in the proper direction. Since the boat is enabled to be lifted above the surface 13 of pond 15, it is not dragging in the mud and is not holding back progress of the boat through the water, yet the boat is being propelled in a straight direction according to the direction of steering wheels 62 and 64 as set by hydraulic cylinder 82. Again in FIG. 4, it is seen that the boat is beginning to approach a levee 100 wherein hydraulic cylinder 74 is retracted to move drive system 60 to a higher position so that it may be propelled above levee 100 via drive wheels 34 and 36.

In FIG. 5 is seen that boat 12 has been lifted, due to the wide expansion of cylinders 44 and 74 to a height so as to clear the very top of levee 100 as the boat is moved from pond 15 onto dry land 13 as seen in FIG. 5. This is of crucial importance since without this ability to lift boat 12 to the position as seen in FIG. 5, one could not clear the level of the levee 100 and therefore could do damage to the boat, cause it to become stalled atop the levee and require a vehicle to pull it off of the levee if need be. Likewise, in FIG. 6, boat 12 has cleared levee 100 and all that is required is that the rear drive wheels 34 and 36 propel it completely over levee 100 so that the boat can be replaced in the position as seen in FIG. 1 for travel along level land.

Although FIG. 3 was discussed as illustrating boat 12 being powered by drive wheels 34 and 36, FIG. 3 may also illustrate boat 12 placed in the fully "floatable" position by placing the hydraulic system in the 4th position, i.e., in the position so that no fluid pressure is present in the hydraulic pistons. Therefore, the drive wheels 34 and 36 and steering wheels 62 and 64 drop and make contact with the surface beneath the water. As the boat floats along, the wheels move upward and downwardly freely, following the terraine below them and are used to power or steer boat 12. However, it should be noted that drive wheels 34 and 36 if raided slightly under hydraulic power may serve as "paddles" to propel the boat in the water.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus, movable upon land an in water, for harvesting crayfish, comprising:

a. a container portion having side walls and a floor for remaining bouyant on the surface of a body of water;

b. steering means, mounted on the front of the container portion, movable across substantially a 180 degree arc, including a wheel member which makes contact with the bottom of the body of water so that the container portion is steered substantially in the direction of the steering means, the wheel member having a substantially smooth surface for engaging the bottom of the body of water with a minimum amount of friction;

c. power means, including a drive wheel for moving the apparatus at a plurality of speeds, the drive wheel having a plurality of transverse tread plates adhered to its surface for obtaining maximum traction while contacting the bottom of the body of water, mounted substantially on the rear of the container portion for forcibly moving the container portion along the water as the drive wheel makes contact with the water bottom; and d. means interconnecting the steering means with the container portion and the power means with the container portion for moving the container portion from a first position, substantially at the level of the power means and the steering means, so that the wheels do not make contact with the bottom of the body of water and the container portion floats in the water, to a second position resting above the level of the power means and the steering means.

2. An apparatus, movable upon land and in water, for harvesting crayfish, comprising:

a. a container portion having side walls and a bottom defining a bouyant floatable structure;

b. power means, comprising a pair of hydraulically driven power wheels positioned in relation to the rear of the container portion for power driving the container portion as the power wheels make contact with the bottom of the body of water or dry land, the power wheels comprising a plurality of traction members secured substantially perpendicular to the ground-contacting surface thereof for securing maximum traction during movement of the apparatus over land or water;

c. steering means, positioned substantially to the front of the container portion, comprising a free-rotating steering wheel movable in substantially a 180 degree arc for steering the container portion substantially in the direction of the steering wheel; and d. means, interconnecting the power means and the container portion and the steering means and the container portion for raising the container portion to a position substantially above the level of the power wheels and steering wheel, so that the container portion may be propelled from water and over raised portions of land; and e. a rigid bar member extendable between the front and rear portions of the container portion for maintaining the structural integrity of the container portion while the apparatus is moved along land, yet providing an open area between the floor of the container portion and the bar member.

3. The apparatus in claim 2, wherein the container portion is movable to a position substantially at the level of the power wheels and steering wheel following the movement of the container portion over the raised land areas.

4. The apparatus in claim 2, wherein the container portion may float within the body of water when positioning the power wheels and steering wheel in a free moving position relative to the position of the container portion.

* * * * *